Nov. 15, 1966 A. J. BUCHBINDER ETAL 3,285,122
DEVICE FOR INSPECTION OF THE INTERIOR OF HOLLOW BODIES
Filed July 17, 1961 4 Sheets-Sheet 1
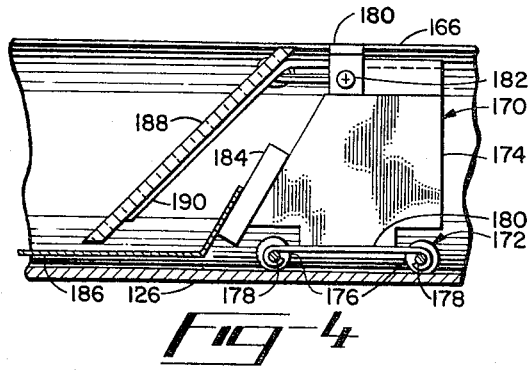
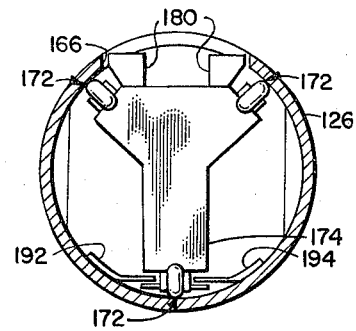
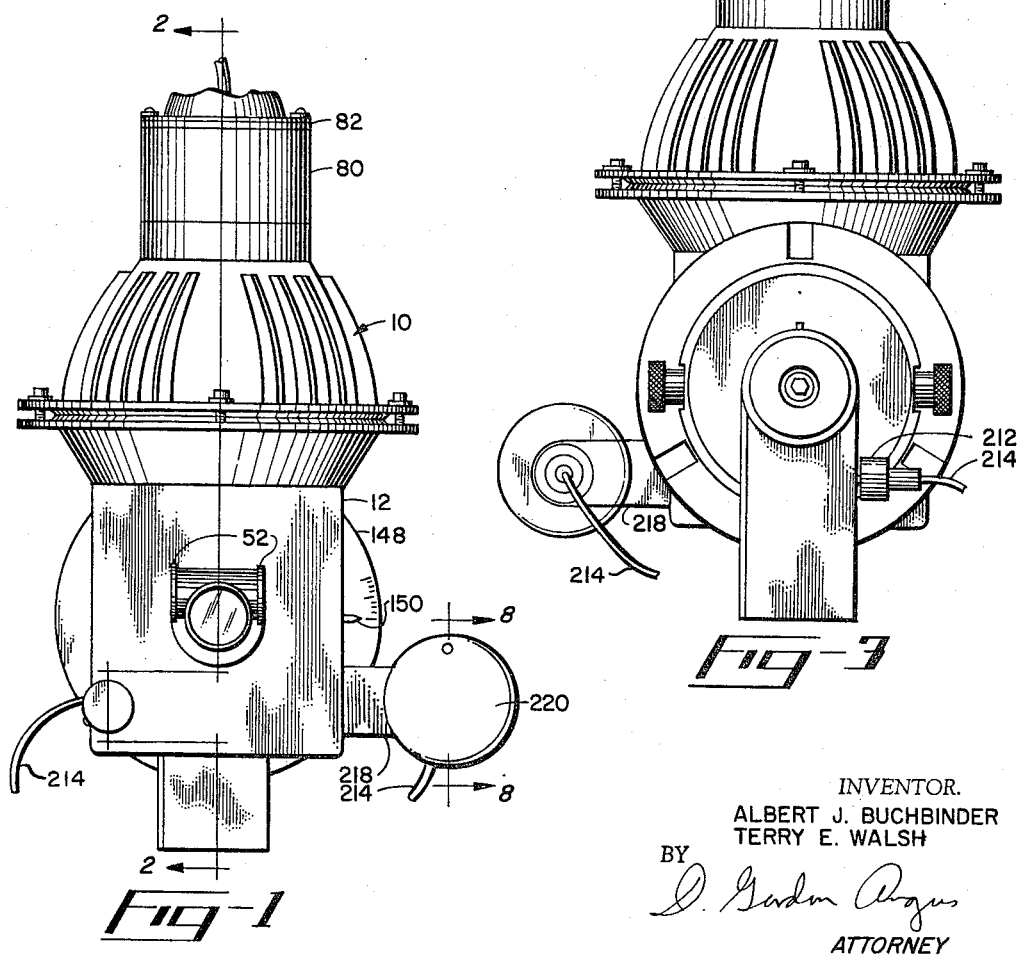
INVENTOR.
ALBERT J. BUCHBINDER
TERRY E. WALSH
BY
ATTORNEY

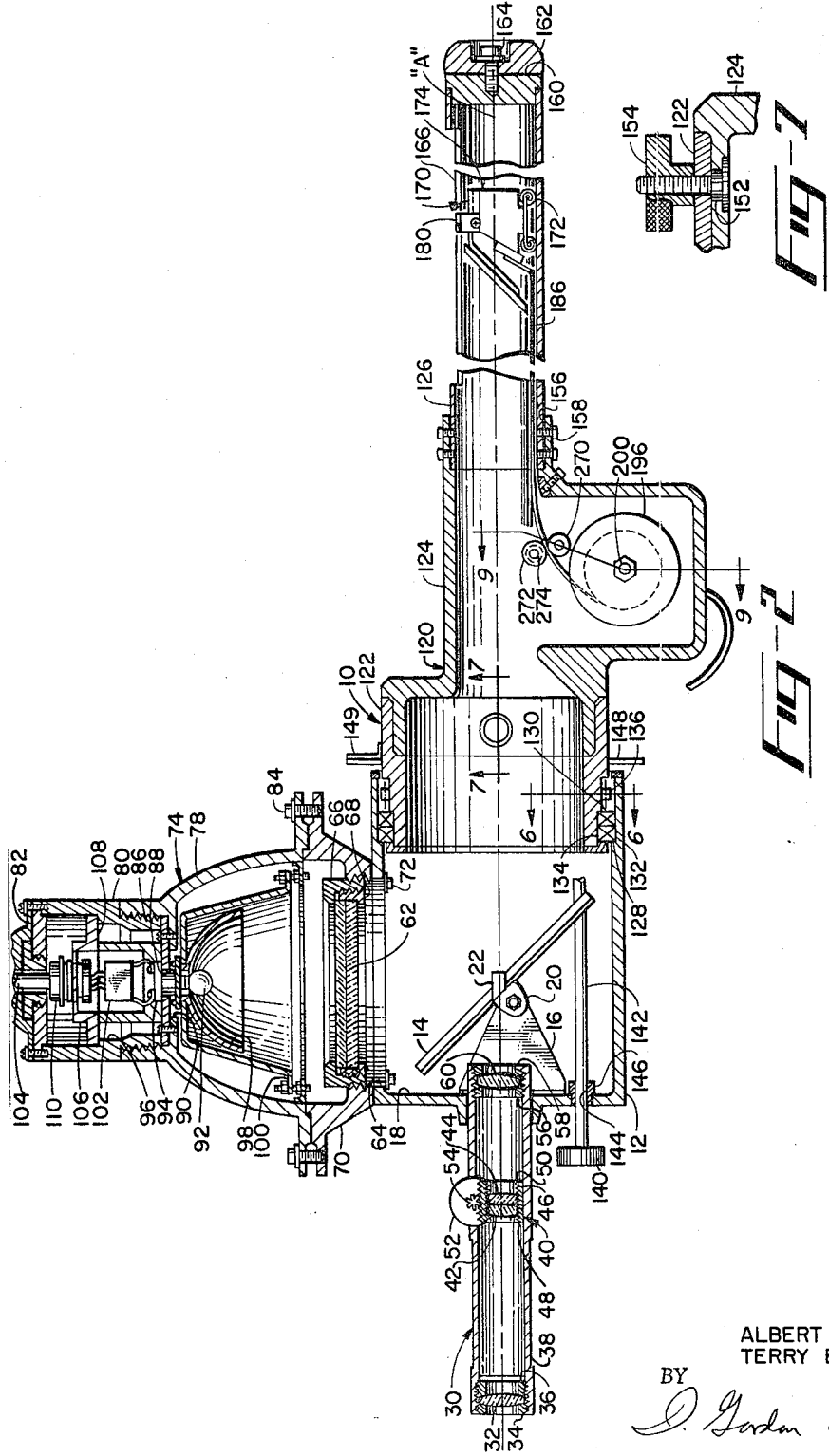

INVENTOR.
ALBERT J. BUCHBINDER
TERRY E. WALSH
BY
ATTORNEY

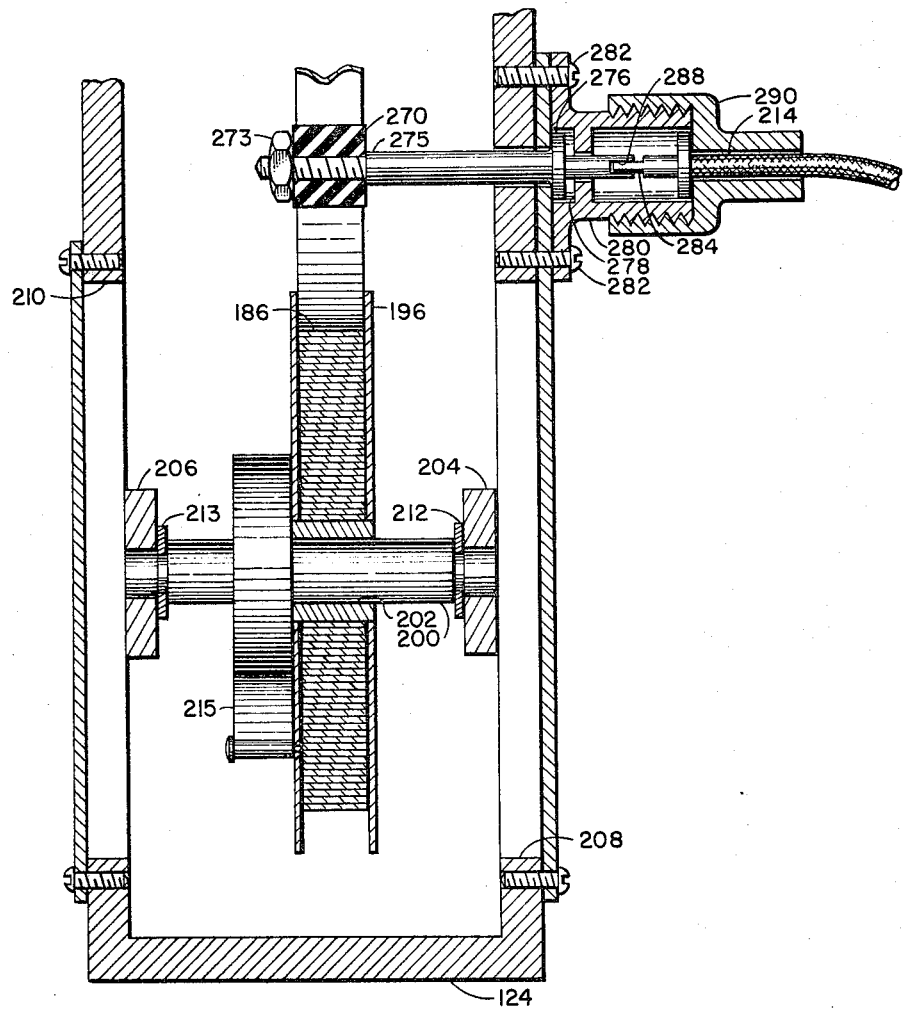

United States Patent Office 3,285,122
Patented Nov. 15, 1966

3,285,122
DEVICE FOR INSPECTION OF THE INTERIOR OF HOLLOW BODIES
Albert J. Buchbinder, West Covina, and Terry E. Walsh, Fullerton, Calif., assignors to Aerojet-General Corporation, Azusa, Calif., a corporation of Ohio
Filed July 17, 1961, Ser. No. 124,429
5 Claims. (Cl. 88—14)

This invention relates to an inspection instrument and has for its principal object to provide a device for the visual inspection of the interior of hollow bodies.

The ability to inspect the interior of hollow bodies, such as solid rocket motors, enhances the probability of detecting flaws, cracks and inclusions that are sometimes only visible from the interior. Most rocket motors have the solid propellant cast directly into the rocket motor casing and cured in place. A longitudinal core in the propellant allows the material to deflect while curing and also provides a burning surface while the rocket is in use. Defects on the internal surface of the solid propellant can cause non-uniform burning of the propellant surface and therefore prevent the rocket motor from operating at an optimum efficiency. Accordingly, the propellant must be inspected thoroughly before firing.

Available borescopes and other commercial inspection devices are all inadequate to inspect such things as solid rocket motors. Some of the deficiencies of the available devices are: illumination insufficiency, insufficient structural support when inserted in the grain bore, insufficient depth of field, insufficient magnification, generally fixed instrument length, and dangerous lighting power circuits.

In accordance with our present invention we overcame many of the deficiencies of the devices now available.

Briefly, the present invention has a housing supporting a rotatable arm. A tiltable mirror is mounted in the housing and deflects light from a light source mounted atop the housing toward the rotatable arm. A carriage, slidably mounted in the arm, carries a reflector positioned at right angles to the titlable mirror. A slot along the entire length of the arm allows the carriage to be moved longitudinally in the arm and the light to be reflected externally of the arm. A telescope is attached to the housing and directed toward an opening in the tiltable mirror. The telescope is directed toward the reflector and scans the reflected light image.

Other objects and features of this invention will appear in the following description and appended claims, reference being had to the accompanying drawings forming a part of this specification wherein like reference characters designate corresponding parts in the several views.

FIG. 1 is a front elevation of the inspection instrument in accordance with the present invention;

FIG. 2 is a longitudinal cross section taken along line 2—2 in FIG. 1;

FIG. 3 is a rear elevation of the present invention;

FIG. 4 is an enlarged cross section of the reflector and carriage as shown in FIG. 2;

FIG. 5 is a enlarged end elevation of the reflector and carriage as shown in FIG. 4;

FIG. 7 is a cross section of the lock nut taken on line 7—7 of FIG. 2;

FIG. 9 is a cross section of the reel and associated parts taken on line 9—9 of FIG. 2;

Figure 6:
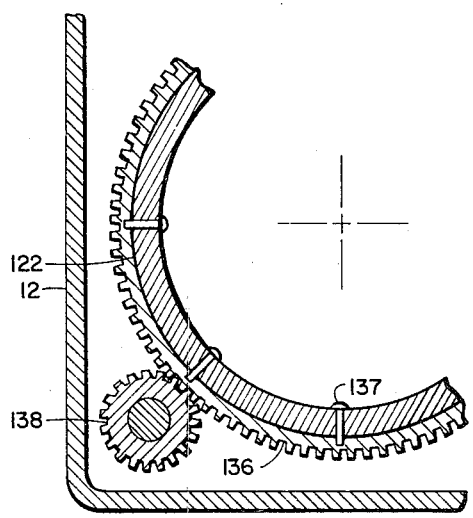
FIG. 6 is a cross section of the adjusting gear and pinion taken on line 6—6 of FIG. 2.

Before explaining the present invention in detail, it is to be understood that the invention is not limited in its application to the details of construction and arrangement of parts, illustrated in the accompanying drawings since the invention is capable of other embodiments and of being carried out in various ways. Also, it is to be understood that the phraseology or terminology employed herein is for the purpose of description and not of limitation.

FIG. 2 illustrates a longitudinal cross section view of the preferred embodiment of the optical inspection device 10, the principal components of which are mounted within the substantially rectangular housing 12 having a longitudinal or optical axis "A." A light projecting or reflecting device, as for example a mirror or reflector 14, is mounted within the housing 12 at an angle to the housing longitudinal or optical axis "A." A bracket 16 mounted on the side of the wall 18 is pivotally connected to the mirror mounted strut 20 via the conventional screw and nut arrangement. A tube 22 centrally mounted on the mirror 14 provides an aperture to view the interior of the hollow body coaxially with any light that is projected by a light projecting or reflecting device.

A conventional telescope 30 is mounted on the side of the housing 12 on the same longitudinal or optical axis "A." An eye piece lens 32 is held in position by a pair of rings 34, 36 threadedly received within the tube 38. A focusing lens assembly 40 is composed of a double convex lens 42 and a converging concavo-convex lens 44 held within a slidable sleeve 46 by a pair of threaded rings 48, 50. Sleeve 46 is positioned in the central portion of the tube 38 and has on its periphery a series of gear teeth to form a rack. As shown in FIGS. 1 and 2 the adjustment screw 52 is provided with a pinion 54 that engages the rack and provides for longitudinal adjustment of the focusing lens assembly 40. A pair of threaded rings 56, 58 hold the objective lens 60 within the tube 38.

A double concave lens 62 is positioned above an opening 64 in the housing 12. The upper and lower threaded rings 66, 68 are positioned on opposite sides of the lens 62 and afford a holding means by which the lens may be held in the assembly. A double concave lens is used in order to collect light and concentrate it upon the mirror or reflector 14.

A mounting flange or adapter 70 is attached to the housing by a plurality of screws 72 and is positioned concentric with the housing opening 64.

A light source enclosure assembly 74 is composed of a light source 92, a bell shaped housing 78, a support member 80, and a cover plate 82. The bell shaped housing 78 is contiguously fitted upon the mounting flange or adapter 70 and fixedly attached thereto by a series of bolts 84. The threads 86 on the lower portion of the support member 80 engage with the threaded recess in the uppermost portion of the bell shaped housing 78. An orifice 88 in the lowermost portion of the support member 80 is positioned concentrically with the opening 90 in the bell shaped housing 78.

A light source 92 used for general purposes may be a white incandescent light bulb which has, for example, an intensity of 150–2200 foot candles measured at a distance varied between two to twelve feet from the light source. When the inspection device is used to inspect the interior of a hollow body, such as a solid rocket motor, the light source when incident upon the propellant grain, cannot cause a grain temperature rise exceeding 15° F. about the ambient. A light source used for rocket propellant inspection purposes should not emit infrared rays because of the detrimental heat emitted therefrom. The light rays emitted from a light source such as from a zirconium arc lamp contain all the colors of the spectrum except infrared rays, and such a light source is therefore suitable for inspection devices used for heat sensitive objects.

A light bulb socket 94 positioned in the support member recess 96 extends downwardly to the support member orifice 88. The conventional reflector 98 surrounds the light source 92 and is held in position by three equally spaced support brackets 100 that are in turn attached to the interior of the bell shaped housing 78. In the present embodiment, a transformer 102 is interposed between and connected to the electrical cord 104 and the light socket 94 to stepdown the industrial voltage to a value useable by the light source 92. Depending on the type of the light source and the power requirements, a transformer could be eliminated by manipulating the type of light bulb used. The hat shaped bracket 106 is positioned in a second recess 108 in the support member 80 and supports the electrical cord terminal block 110.

A rotatable arm assembly 120 is mounted concentric with the housing optical or longitudinal axis "A." The arm assembly 120 includes a tubular member 122, a head 124, and one or more lengths of tubing 126. A pair of roller bearings 128, 130 are pressed into the counterbore 132 in the housing 12 and the turned-down portion 134 of the tubular member 122.

The annulus shaped gear 136 is pressed on the tubular member 122 and held in place by fasteners, such as pins 137. Referring now to FIGS. 2 and 6, the pinion 138 is engaged with the gear 136 and has an operating means extending externally of the housing. In the present embodiment, the operating means is a hand-operable knob 140 attached to an extended stem 142 that is fixedly attached to the pinion 138. A bearing 144 centrally located in the housing boss 146 supports the stem 142. In the event that the arm assembly 120 is of such a size that rotation by a hand operated knob becomes difficult, a motor drive may be substituted for the knob.

An annulus shaped protractor 148 circumvents the arm assembly 120 and is held in place by an L shaped bracket 149. Any suitable process such as soldering, brazing, welding, etc. is used to attach the bracket 149 to the protractor 148 and to the arm assembly 120. The pointer 150 (FIG. 1) is fixedly attached to the housing 12 and in juxtaposition with the protractor 148 and can aid the inspection device operator by giving him the angular position of the arm assembly 120 in relation to the item being inspected.

Referring now to FIGS. 2, 3, and 7, a lock screw 152 passes through the head 124 and the tubular member 122 and threadably engages with the nut 154. This lock screw 152 and nut 154 arrangement allows the rapid disassembly of the head 124 from the tubular member 122 without further disassembly of the arm assembly 120.

The recess 156 on the forward portion of the head 124 receives the tube 126 that is held therein by a plurality of screws 158. The tube 126 has a plug 160 closing the end thereof remote from the head 124, and a rounded end cap 162 is attached to the plug 160 by a quarter turn fastener 164. As shown in FIGS. 2, 4, and 5, a slot 166 is formed along the entire length of the tube, minus a small length at each end.

When the present invention is used for inspecting the interior of a hollow body, such as a rocket motor, all parts should be constructed and fabricated from non-sparking materials to prevent accidental ignition of the propellant grain during inspection.

Referring now to FIG. 2 and more especially to FIGS. 4 and 5, the carriage assembly 170 is slidably mounted within the tube 126. Three sets of rolling devices 172 are mounted upon the diverging points of the Y shaped carriage 174. Each rolling device 172 is comprised of two wheels 176 formed with integral axles 178 and a pair of flat spring supports 180 extending longitudinally on the carriage 174 and curved inwardly around the axles 178. The wheels 176 may be fabricated from a non-sparking anti-friction material such as molded nylon. A pair of fingers 180 are mounted to the carriage sides by the screw 182 and are positioned to project within the tube slot 166 in spaced relation with the tube walls bounding the opposite sides of the tube slot 166 for carriage alignment purposes. The carriage tongue 184 mounted on the carriage 174, extends downwardly and the flexible tape 186 is mounted thereon. The mirror or reflector 188 is mounted on the bracket 190 that is fixedly attached to the carriage 174. This mirror or reflector 188 is positioned at an angle to the longitudinal or optical axis "A" thereby acting to reflect light, projected along the optical axis, to be diverted through the tube slot 166. A pair of tracks 192, 194 are mounted in the lower portion of the tube 126 in spaced relation with the wheels 176 thereby eliminating the lateral movement of the carriage assembly 170 while it is moved longitudinally in the tube 126.

Reference is made to FIGS. 2 and 9, wherein the reel 196 has a roll of steel tape 186 mounted thereon and is positioned within the head 124. A shaft 200 extends through the reel hub 202 such that the reel 196 is rotatable about the shaft 200, the shaft 200 being supported at its ends by a pair of straps 204, 206. These straps 204, 206 bridge the head openings 208, 210 and are secured by screws (not shown) to the head 124. Snap rings 212, 213 prevent the lateral movement of the shaft 200. Flat coiled spring 215 has its extremities attached to the shaft 200 and the reel 196 to keep the reel under constant tension. A reel operating device such as the friction wheel 270 operates as a means for winding and unwinding the steel tape 186 with respect to the reel 196 so as to move the carriage assembly 170 along the tube 126.

As shown in FIG. 2 a second wheel 272 is positioned opposite the friction wheel for stabilizing purposes. The second wheel 72 is rotatably mounted on a shaft 274 that is pressed into the head 124. This wheel 272 is retained on shaft 274 by a pair of snap rings (not shown).

Referring again to FIG. 9, the friction wheel 270 is mounted on the driving shaft 275 and is held thereon by a nut 273. A collar 276 on the shaft 275 prevents lateral movement and also mates with the cavity 278 in the mounting bracket 280. A pair of screws 282 threadedly engage the head 124 and secure the bracket 280. A tongue 284 formed on the extremity of the flexible cable 214 is held by a pin within the slot 288 of the driving shaft 275. Threaded cap 290 threadedly engages the bracket 280 and supports the rotatable flexible cable 214.

Figure 8:
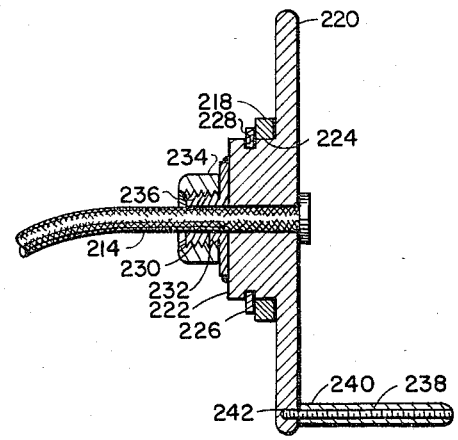
FIG. 8 is a cross section of the crank taken on line 8—8 of FIG. 1.

A means for rotating the flexible cable 214 is shown in FIGS. 1, 3, and 8. An L-shaped bracket 218, fixedly attached to the housing 12, supports a rotatable crank 220. An integrally formed crankshaft 222 extends through a drilled hole 224 in the bracket 218 and is held in place by a snap ring 226 fitting within the groove 228. A conventional collet 230 is welded to the crankshaft 222 and has a series of longitudinal slots 232 extending over a portion of its length. Rotation of the nut 234 on the collet 230 gradually causes the collet nose 236 to compress, thereby firmly gripping the flexible cable 214. A connecting pin 238 extends through the rotatable handle 240 and is fitted into a blind hole 242 provided in the crank 220 to mount the handle 240 on the crank 220. Rotation of the crank 220 causes rotary power to be transmitted through the crank to the reel 196 that in turn winds the steel tape 186 causing the carriage 170 to be traversed along the length of the tube 126.

Figure 10:
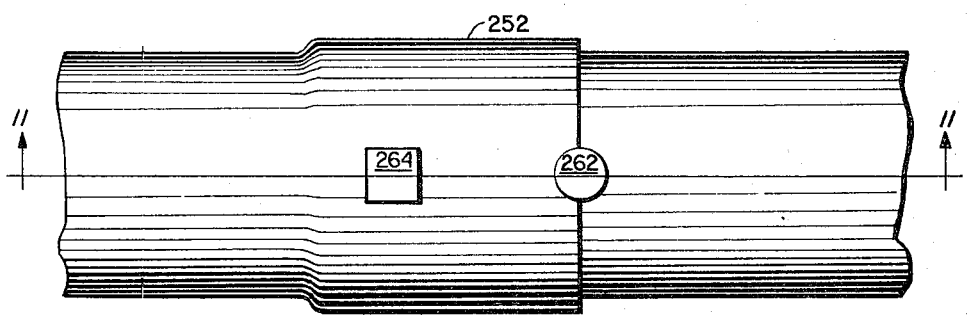
FIG. 10 is a plan view of an alternative embodiment of the tube.
Figure 11:
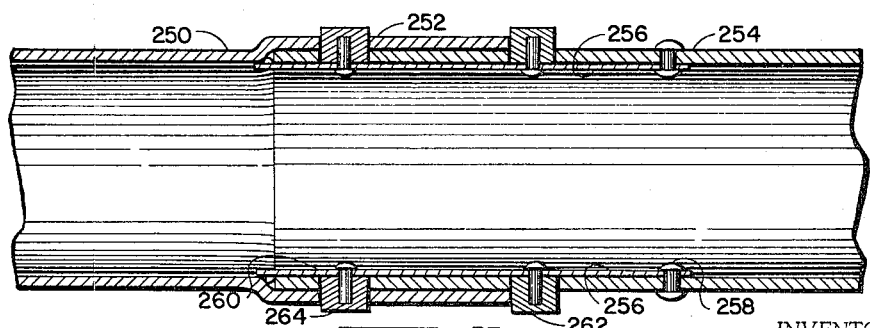
FIG. 11 is a cross section of the tube taken on line 11—11 of FIG. 10.

For applications which require an extremely long field of view, a plurality of tubes 126 may be assembled in the manner as shown in FIGS. 10 and 11. In this embodiment, each tube 250 has an enlarged portion 252 that may receive another tube 254 in telescoping relation. A locking device 256 is attached to opposite sides of the tube 254 by rivets 258. A flat spring 260 has a cylindrical button 262 and a square key 264 that fit within corresponding shaped holes in the tube 254 and the enlarged portion 252 of tube 250, respectively. Tubes 250, 254 are assembled and the buttons 262 released, causing the keys 264 to engage their respective holes and locking the tubes into a solid unit. A continuous slot is formed in the tubes to allow the mirror on the carriage assembly 170 (FIG. 4) to constantly reflect an image without interruption.

The manner of inspecting a hollow body by employing the described apparatus will now be explained. The tube 126 is inserted into a hollow body through an inspection orifice or other available opening. Light rays from the light source 92 impinging on the mirror or reflector 14 are projected or reflected onto the carriage mounted mirror or reflector 188 thereby illuminating the area to be inspected. By viewing through the telescope 30 and the tube 126, an operator may observe the image on the carriage mounted mirror or reflector 188. The operator then rotates the crank 220 that causes the steel tape 186 to be reeled or unreeled thereby traversing the carriage assembly 170 along the length of the tube 126. After each pass along the tube 126, the hand operated knob 140 is rotated to revolve the arm assembly 120 a desired amount as indicated by the pointer-protractor arrangement. This arm rotation and carriage traversal is repeated until the entire hollow body is inspected.

Although a specific embodiment of the invention has been shown and described, it will be understood, of course, that it is only illustrative and that various modifications may be made therein without departing from the scope and spirit of this invention as defined in the appended claims.

We claim:

1. An inspection instrument for insertion into a hollow body to enable viewing of the interior thereof, said inspection instrument comprising: a housing having a longitudinal axis, a source of light attached to said housing and positioned at an angle to the longitudinal axis of said housing, a first reflector positioned within said housing at an angle to said source of light and in alignment therewith for projecting light from the said source of light as a beam extending along the longitudinal axis of said housing, a telescope attached to said housing in coaxial relation to the longitudinal axis of said housing, a head rotatably mounted on said housing in oppositely disposed relation to said telescope, an elongated tube attached to said head and having a longitudinal axis coaxial with the longitudinal axis of said housing, said tube having an extended slot therein, a carriage positioned within said tube, a second reflector mounted on said carriage in angular relation to the longitudinal axis of said tube and directed toward the extended slot in said tube in opposing relation to said first reflector, and means for moving said carriage and said second reflector mounted thereon axially within said tube through a distance traversing the entire length of the extended slot in said tube, the beam of light projected from said first reflector being directed against said second reflector so that said second reflector transmits light through the extended slot in said tube to illuminate the region outside of said tube and adjacent the extended slot therein, whereby said telescope can be focused for observing the illuminated region with light reflected from said second reflector.

2. An inspection instrument as defined in claim 1, wherein said carriage has a pair of fingers mounted thereon which project within the extended slot in said tube to align said carriage within said tube for guided axial movement with respect thereto.

3. An inspection instrument as defined in claim 1, wherein said means for moving said carriage axially within said tube comprises a reel mounted for rotation within said head, flexible tape wound about said reel extending into said tube and attached at one end thereof to said carriage, and a crank externally mounted on said housing for rotation with respect thereto and operably connected to said reel for imparting rotation thereto upon rotation of the crank.

4. An inspection instrument for insertion into a hollow body to enable viewing of the interior thereof, said inspection instrument comprising: an elongated tube having a longitudinal axis and being provided with an extended slot therein, a light deflecting means disposed in said tube in angular relation to the longitudinal axis thereof and directed toward the extended slot in said tube, light source means providing light incident on said light deflecting means so that said light deflecting means transmits light incident thereon through the extended slot in said tube to illuminate the region outside of said tube and adjacent the extended slot therein, means for moving said light deflecting means axially within said tube through a distance traversing the entire length of the extended slot in said tube, and means operably connected to said tube in axially spaced opposed relation to said light deflecting means arranged to be focussed for observing the illuminated region with light deflected from said light deflecting means.

5. An inspection instrument for insertion into a hollow body to enable viewing of the interior thereof, said inspection instrument comprising: a housing having a longitudinal axis, a source of light attached to said housing and communicating with the longitudinal axis of said housing, light projecting means positioned within said housing in alignment with said source of light for projecting light from said source of light as a beam extending along the longitudinal axis of said housing, an elongated tube having an extended slot therein, means securing said tube to said housing for relative rotation therebetween, said tube having a longitudinal axis in axial alignment with the longitudinal axis of said housing and forming a continuation thereof, a light deflecting means disposed in said tube in angular relation to the longitudinal axis thereof and directed toward the extended slot in said tube, means for moving said light deflecting means axially within said tube through a distance traversing the entire length of the extended slot in said tube, the beam of light projected from said light projecting means being directed against said light deflecting means so that said light deflecting means transmits light through the extended slot in said tube to illuminate the region outside of said tube and adjacent the extended slot therein, and means on said housing arranged to be focused for observing the illuminated region with light deflected from said light deflecting means.

References Cited by the Examiner

UNITED STATES PATENTS

| | | | |
|---|---|---|---|
| 815,657 | 3/1906 | Swasey | 88—72 |
| 954,707 | 4/1910 | Spear | 88—72 X |
| 1,309,478 | 7/1919 | Jenkins | 88—72 |
| 1,564,432 | 12/1925 | Marcuse et al. | 88—14 |
| 2,479,518 | 8/1949 | Scherbatskoy. | |
| 2,577,807 | 12/1951 | Pryor | 88—14 X |
| 2,609,728 | 9/1952 | Cadwell | 88—71 |
| 2,632,801 | 3/1953 | Donaldson. | |
| 3,151,205 | 9/1964 | Sparer | 88—1 X |

FOREIGN PATENTS 123,330 12/1959 U.S.S.R.

JEWELL H. PEDERSEN, *Primary Examiner.*

E. G. ANDERSON, *Examiner.*

T. L. HUDSON, A. A. KASHINSKI, *Assistant Examiners.*